April 13, 1965 B. A. PHILLIPS ETAL 3,177,681
ABSORPTION REFRIGERATION SYSTEM
Filed Aug. 10, 1961 3 Sheets-Sheet 3
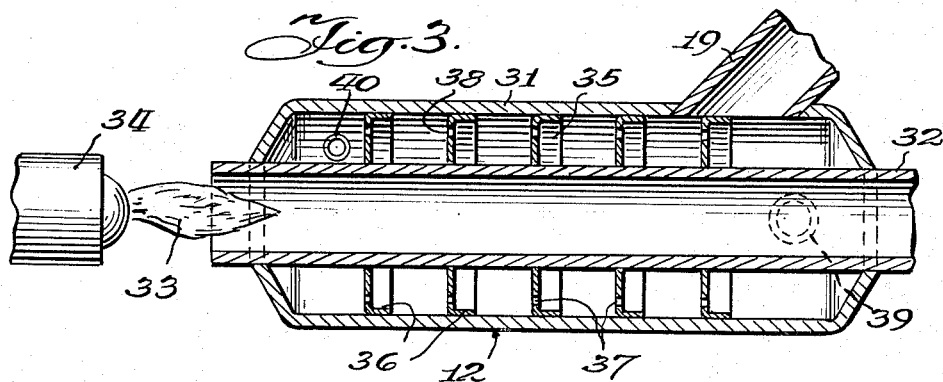
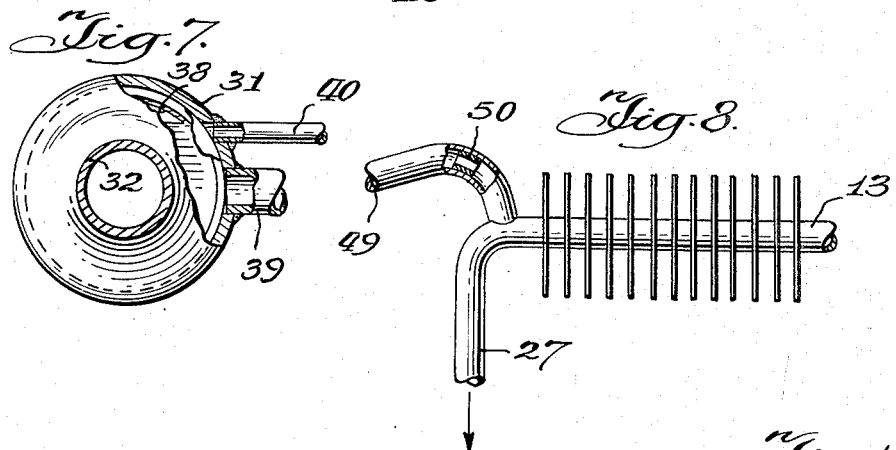
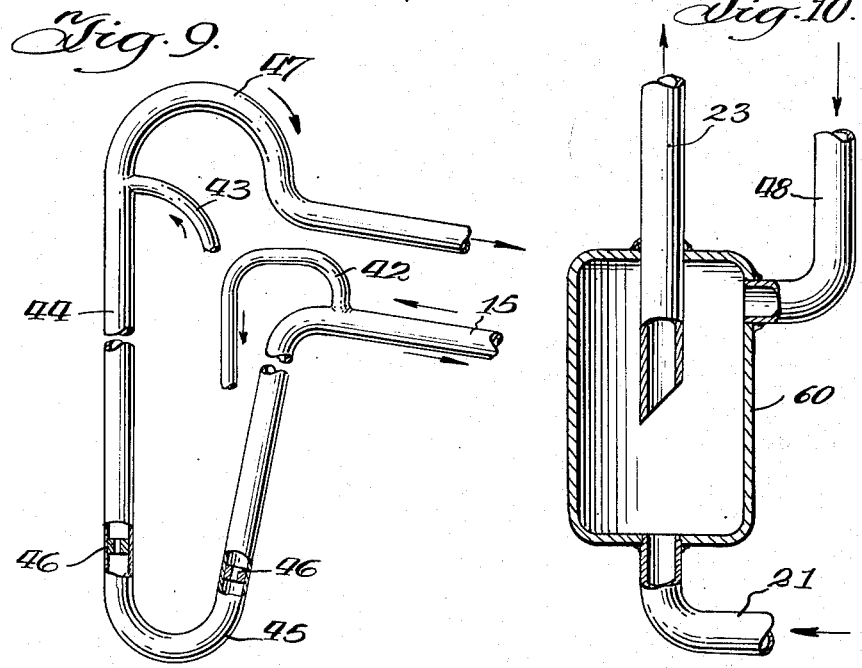

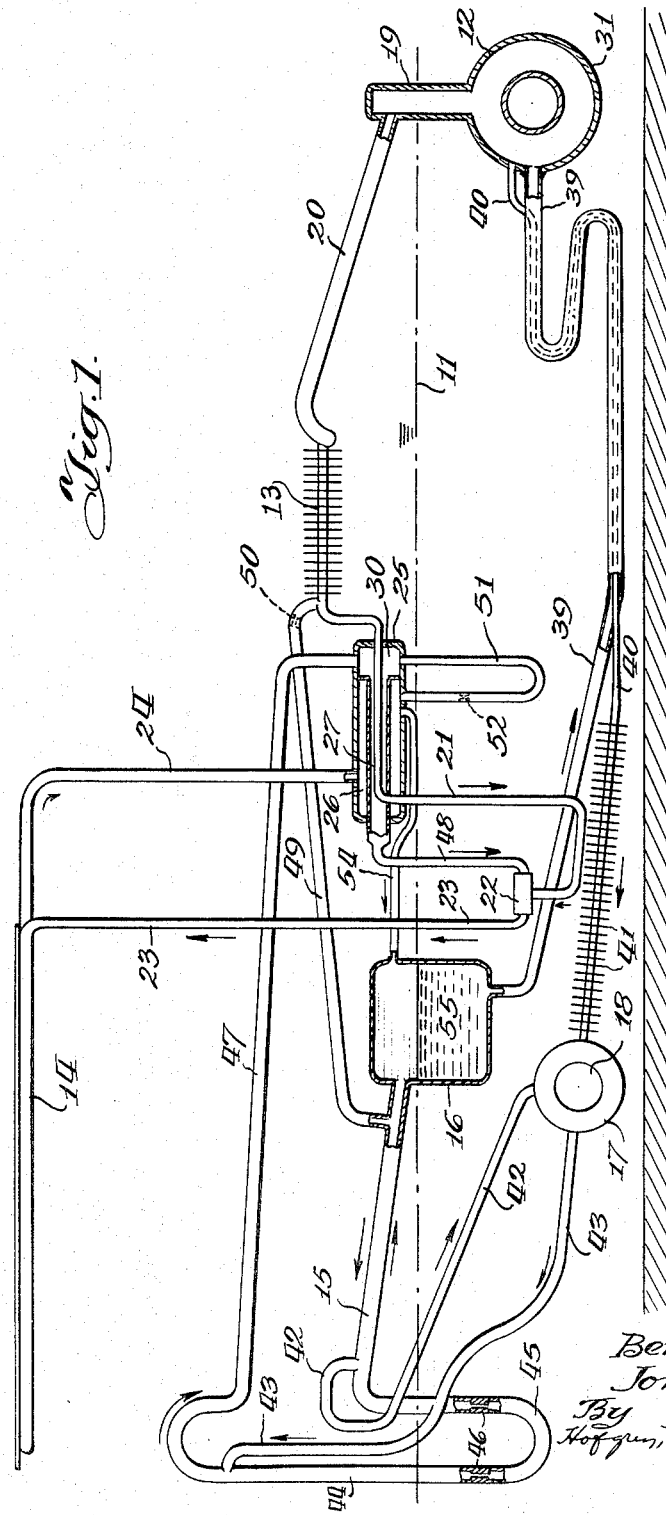

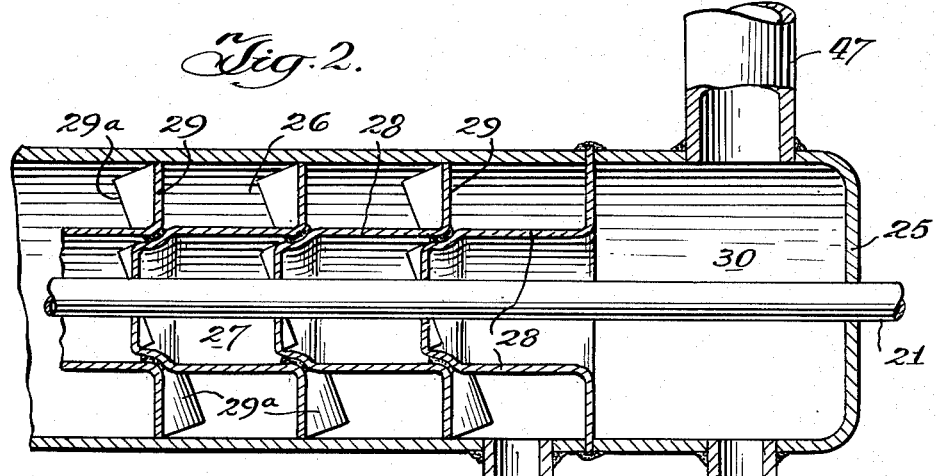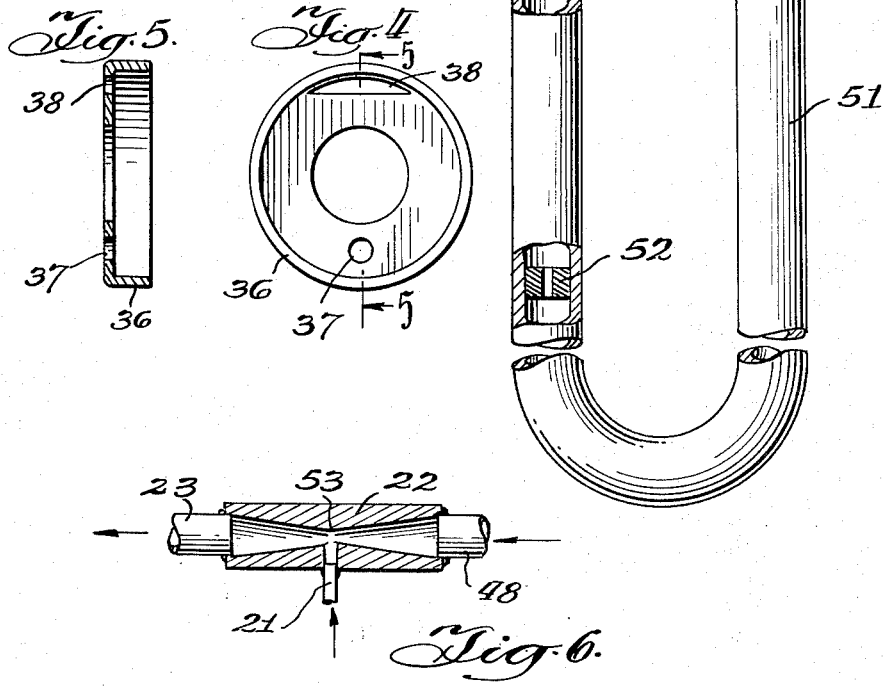

United States Patent Office 3,177,681
Patented Apr. 13, 1965

3,177,681
ABSORPTION REFRIGERATION SYSTEM
Benjamin A. Phillips and John Roeder, Jr., Benton Harbor, Mich., assignors to Whirlpool Corporation, a corporation of Delaware
Filed Aug. 10, 1961, Ser. No. 130,521
5 Claims. (Cl. 62—483)

This invention relates to an absorption refrigeration system.

In an absorption refrigeration system of the uniform pressure type in which an inert gas or auxiliary pressure equalizing fluid is employed the refrigerant may be ammonia, the inert gas may be hydrogen and the absorption liquid may be water to form a solution with the ammonia refrigerant. In such a system, a generator is used to boil off gaseous refrigerant from the solution or liquid rich in dissolved refrigerant. The refrigerant gas is then conveyed to a condenser where it is condensed to liquid refrigerant and is then conveyed into an evaporator for evaporation into an atmosphere of the inert gas to produce the cooling effect. The resulting weak liquid from the generator which is then relatively poor in dissolved liquid is then conveyed to an absorber and is there contacted with gas from the evaporator that is a mixture of the inert gas and gaseous refrigerant and that is rich in refrigerant. In the absorber the gaseous refrigerant from the rich gas is absorbed into the weak liquid whereupon the weak liquid becomes rich liquid. From the absorber the resulting rich liquid is conveyed back to the generator where the process is repeated.

The present invention is concerned with such a refrigeration system in which the evaporator may be at a level higher than the condenser and in which the parts of the system, including the evaporator if desired, form a unit of very low height that can easily be positioned in the bottom of a refrigerator cabinet. In the past absorption refrigeration systems have customarily been located at the back of the refrigerator cabinet and occupied considerable space so that the cabinet of the absorption refrigerator was considerably larger than the cabinet for a compressor refrigerator for the same storage capacity. With the present invention not only is this avoided but the same cabinet type and size can be used if desired for both the absorption and the compressor refrigeration systems in the event a manufacturer should produce both lines of refrigerators. Furthermore, with the absorption system of this invention the evaporator does not need to be located beneath the condenser as is true with conventional absorption systems but can be located anywhere desired. Also, the evaporator of this system may be located in the bottom of the cabinet if desired so that a freezer section can be provided at the bottom. This has not customarily been practical with prior absorption refrigeration systems.

One of the features of this invention is to provide an improved absorption refrigeration system in which gravity flow of fluids take place in a portion of the system but pressure flow is provided in other portions of the system with the result that the system can be constructed with a very low height and the evaporator can be located any place desired.

Another feature of the invention is to provide such a system in which pressure is applied to the gas and the gas used to provide for circulation of a portion of the liquid.

Other features and advantages of the invention will be apparent from the following description of embodiments thereof as illustrated in the accompanying drawings. Of the drawings:

FIGURE 1 is a semi-diagrammatic representation of an absorption refrigeration system embodying the invention.

FIGURE 2 is an enlarged fragmentary cross sectional view through one end of a gas heat exchanger of the system.

FIGURE 3 is an enlarged fragmentary sectional view through the generator of the system.

FIGURE 4 is a front elevational view of one of the transverse partition plates of the generator.

FIGURE 5 is a sectional view taken substantially along the line 5—5 of FIGURE 4.

FIGURE 6 is a diagrammatic sectional view illustrating a jet pump used in the refrigeration system.

FIGURE 7 is an end elevational view partially broken away for clarity of illustration of the generator of FIGURE 3.

FIGURE 8 is a fragmentary end elevational view partially broken away illustrating the condenser at the liquid drain and vent end.

FIGURE 9 is a fragmentary side elevational view of the separation chamber of the refrigeration system.

FIGURE 10 is a sectional view illustrating an alternate embodiment of the liquid lifting arrangement for lifting liquid refrigerant into the evaporator.

The absorption refrigeration unit illustrated in the accompanying drawings has a charging liquid level line illustrated at 11 which is the level of the liquid during operation when the system is initially charged with an inert gas, a refrigerant and an absorption liquid. The most commonly used inert gas is hydrogen with ammonia being the refrigerant and water the absorption liquid. Since the inert gas is provided with forced circulation as described herein, other inert gases such as nitrogen may be used. In this system there is provided a generator 12 located beneath the liquid level 11, a condenser 13 located above this liquid level, an evaporator 14 also above the liquid level, an absorber 15 above the level 11 and an absorption liquid receiver 16 into which liquid from the absorber 15 empties with the charging level line 11 passing through this receiver. There is also provided a pump 17 beneath the line 11 with this pump having separate intakes for liquid and for gas and having a common outlet. This pump is operated by an electric motor 18 and an illustration of such a pump is that disclosed and claimed in the copending application of Robert W. Fink, Serial No. 26,607, filed May 30, 1960, now Patent 3,055,194, issued September 25, 1962, and assigned to the assignee of this application.

The generator 12 has formed integrally therewith an upwardly extending analyzer 19 sloped with respect to the horizontal as illustrated in FIGURE 3 and which empties into an upwardly sloped rectifier 20 leading to the condenser 13. The end of the condenser opposite the rectifier 20 is connected by means of a pipe 21 to a nozzle 22. The outlet of this nozzle is connected by means of a pipe 23 to the evaporator shown diagrammatically at 14. The outlet of the evaporator 14 is connected by means of a pipe 24 to a gas heat exchanger 25 having separate chambers 26 and 27 in heat exchange association.

The gas heat exchanger 25 is shown in detail in FIGURE 2. As is shown here, the outer chamber 26 and the inner chamber 27 are formed of internested cups 28 each having an annular rim 29 made up of a series of vanes 29a twisted in order to give a twisting motion to gases passing through the outer chamber 26. Internested cups of this type are fully described in Patent No. 1,880,533. An end cup 28 having a solid flange is spaced from an end of the heat exchanger 25 to provide an inlet chamber 30 leading to the inner chamber or passage 27.

The generator 12 is arranged substantially horizontally and comprises a generally cylindrical elongated casing 31 (FIGURE 3) from which the analyzer 19 extends adjacent one end thereof. Substantially coaxial with the casing 31 on the interior thereof is a flue 32 through which are adapted to pass products of combustion from a flame 33 produced by a burner 34. These products of combustion from the flame 33 passing through the flue 32 heat the liquid surrounding the flue 32 to produce the normal effect of boiling off the dissolved refrigerant.

The generator 12 is provided on the interior thereof with annular partitions 35 arranged longitudinally along the flue 32. These partitions are illustrated in detail in FIGURES 4 and 5 and each comprises a shallow cup-shaped disk with an annular rim 36 and each has a circular opening 37 adjacent the bottom and an elongated opening 38 adajcent the top. Openings 37 permit the flow of liquid and openings 38 permit the flow of vapor therethrough. Rich liquid enters the generator at the inlet pipe 39 and flows through the generator, passing through openings 37, to be heated to vaporize the refrigerant. The resultant weak liquid passes out through outlet pipe 40. The refrigerant vapor passes through openings 38 and out through analyzer 19. Thus it will be seen that the rich liquid being boiled and the refrigerant vapor pass in counter-current relationship within the generator for maximum heat exchange and efficiency.

The weak liquid outlet pipe 40 leads to the pump 17 and is provided with cooling fins 41. The liquid pipes 39 and 40 are arranged in heat exchange relationship with the pipe 40 passing through the interior of the pipe 39 in the customary manner for absorption refrigeration systems.

The pump 17 has a second inlet connected to a pipe 42 for weak gas and a common outlet connected to a pipe 43 for mixed weak liquid from pipe 40 and the weak gas from the pipe 42. This mixture is forced through the pipe 43 by the pump 17 and empties into the top of a liquid-gas separator 44. This separator is provided with a liquid trap 45 located beneath the charging liquid level line 11 while the remainder of the separator extends above this line. In each of the side branches of the trap 45 below the line 11 there is provided a restricter orifice member 46.

The top of the separator 44 is connected to a weak gas pipe 47 which leads to the inlet chamber 30 in the gas heat exchanger 25. The opposite end of the inner heat exchanger chamber 27 through which the weak gas passes is connected by a pipe 48 to an inlet in the nozzle 22. The other side of the nozzle is connected by the pipe 23 to the inlet of the evaporator 14.

In order to equalize pressure throughout the refrigeration system on the refrigerant vapor side there is provided a vent pipe 49 extending from the liquid refrigerant end of the condenser 13 to the lower or rich gas end of the absorber 15. This vent pipe 49 is provided with a restrictor orifice member 50 therein similar to the orifice member 46. The member 50 is located adjacent the condenser 13 and at a high point in the vent pipe 49.

As is shown most clearly in FIGURE 2, there is provided a downwardly extending condensate conduit 51 between the inner and outer chambers 26 and 27 of the gas heat exchanger 25. One leg of the conduit 51 communicates with chamber 30 of the heat exchanger while the other leg communicates with the annular chamber 26. Adjacent the bottom of the conduit 51 there is provided a restrictor orifice member 52 similar to the members 46 and 50.

The details of the nozzle 22 are illustrated in FIGURE 6. As is disclosed here weak gas under pressure from the inner chamber 27 of the gas heat exchanger flows under pressure through the pipe 48 into the nozzle 22. In the nozzle this pressurized weak gas flows through the throat 53 to operate as a venturi and create a suction in the pipe 21 which contains liquid ammonia from the condenser 13. The resulting mixture of liquid ammonia and weak gas under pressure then flows up through the vertical pipe 23 into the evaporator 14. The weak gas under pressure which is supplied from the pump 17 by way of the separator 44 therefore serves to lift intermingled liquid refrigerant upwardly into the evaporator. As the liquid ammonia begins to evaporate and produce a refrigerating effect as soon as it contacts the weak gas in the nozzle 22, it is preferred that the entire nozzle 22 and pipe 23 be insulated.

The operation of the refrigeration system is as follows:

Rich liquid from the receiver 16 flows through the pipe 39 into the generator 12. In the generator heat from the flame 33 and heated gases in the flue 32 serve to boil off gaseous ammonia from the ammonia dissolved in the rich liquid. In the generator the back end of the casing 31 (right-hand end as shown in FIGURE 3) contains relatively rich liquid while the liquid becomes progressively weaker as it passes to the front of the generator (left-hand end as shown in FIGURE 3). This weak liquid flows outwardly through the pipe 40 and is cooled by the incoming rich liquid in the pipe 39 as the two pipes are arranged in heat exchange relationship. The weak liquid flows outwardly through the pipe 40 and is cooled by means of the air cooling fins 41 before being drawn into the pump 17.

The ammonia vapors from the generator 12 pass upwardly through the analyzer 19 and rectifier 20 into the condenser 13. The incoming rich liquid in the pipe 39 in the meantime passes forwardly in the generator casing 31 toward the flame 33. Because of the series of partitions 35, flow in the generator is retarded to insure substantially all the dissolved ammonia being boiled off before the resulting weak liquid flows outwardly through the outlet pipe 40. As can be seen in FIGURE 3, the rich liquid inlet pipe 39 is adjacent the end of the generator that is adjacent the analyzer 19 while the weak liquid outlet pipe 40 is adjacent the end of the generator that is adjacent the flame 33.

In the condenser 13 the gaseous ammonia is condensed into liquid ammonia which flows through the pipe 21 into the throat 53 of the nozzle 22.

In the meantime weak gas from the top of the absorber 15 flows through the pipe 42 into the gas inlet of the pump 17. In the pump 17 the mixed weak gas from the pipe 42 and weak liquid from the pipe 40 are expelled through the pipe 43 into the top of the separator 44. In the separator the liquid collects in the trap 45 and overflows into the absorber 15. The weak gas which is of course under pressure from the pump 17 flows upwardly and through the weak gas pipe 47 and through the inner chamber 27 of the gas heat exchanger 25. From the heat exchanger the weak gas under pressure flows through the pipe 48 into the nozzle 22. In the nozzle the weak gas draws liquid ammonia from the pipe 21 and the mixed weak gas and ammonia flows upwardly through the preferably insulated pipe 23 into the evaporator 14 in the manner previously described.

From the evaporator 14 the rich gas containing a high proportion of gaseous refrigerant and also containing small portions of liquid ammonia that have not evaporated flow into the outer chamber 26 of the heat exchanger 25. From here the rich gas flows through the pipe 54 into the receiver 16 in the area thereof above the liquid level line 11. This rich gas then flows upwardly in the absorber 15 countercurrently to the downwardly flowing weak liquid and during their passages through the absorber 15 the weak liquid dissolves refrigerant from the rich gas and becomes rich liquid which collects in the bottom of the receiver 16 as indicated at 55. The rich gas thereupon becomes weak gas and flows out the top of the absorber through the pipe 42 as previously described into the pump 17.

As can be seen, the pump 17 provides a positive pressure for weak gas and weak liquid through a portion of the refrigeration system. Flow in the remainder of the system is the usual gravity flow. Thus, flow of liquid refrigerant from the condenser 13 is a combination of gravity flow and suction in the nozzle 22. Flow of rich gas from the evaporator 14 through the pipe 24 is a gravity flow. Similarly, flow of rich liquid from the receiver 16 through the pipe 39 into the generator is caused by gravity, while flow of weak liquid from the generator through the pipe 40 into the receiver 16 is caused by a combination of gravity flow and suction caused by the pump 17.

The vent pipe 49 is used to equalize pressure between the condenser 13 and the absorber 15. The restrictor orifice 50 provided in this vent pipe aids in inhibiting gaseous ammonia passing from the top surface of the liquid ammonia in the condenser through the vent pipe 49 directly into the absorber 15. The restrictor orifices in the members 46 are useful only when the system is first started up and when the trap 45 contains no liquid. Pressure of the gas in the top of the separator under these conditions would keep liquid from gathering in the trap 45 as any liquid therein would immediately be forced upwardly into the top of absorber 15.

In the gas heat exchanger 25 the weak gas flowing from the separator 44 is cooled by the cold rich gas flowing from the evaporator 14 through the pipe 24. This cooling of the weak gas causes moisture vapor to be condensed therefrom. The condensate which, of course, is water is separated from the weak gas by means of the conduit trap 51. Thus, the condensed water from the weak gas tends to gather in the chamber 30 to flow downwardly in the trap 51 and up into the outer chamber 26 of the heat exchange where it can flow with the rich gas through the pipe 54 into the body of rich liquid 55 in the receiver 16. Here again the restrictor orifice member 52 is useful when the system is first charged to prevent gas from the chamber 30 sweeping small collections of condensed water from the trap 51 which would thereby permit weak gas to escape from the chamber 30 into the outer chamber 26 by way of trap 51. None of the orifice members 46 or 52 would be needed if the traps 45 and 51 are filled with liquid when the system is first charged.

In one example of a refrigeration system embodying the invention the liquid flow rate in the system was about 6 pounds per hour and the orifice in each orifice member 46, 50 and 52 was about 1/8" diameter. Under these conditions the orifices provide substantially no hindrance to the flow of liquid.

The pump 17 not only provides pressure on the weak gas and weak liquid flowing into the separator 44 but also makes the refrigeration system more efficient as the mingling of the liquid and gas in the pump serves to strip additional remnants of ammonia vapor from the weak gas and dissolve it in the weak liquid.

As discussed earlier, the refrigeration system of this invention permits locating the evaporator 14 at any point desired, either at the top or bottom of the cabinet or at an intermediate point. Furthermore, primarily because the flow through the system is caused by a combination of gravity flow and pump pressure flow the remainder of the system may be constructed with very low height.

FIGURE 10 illustrates a second embodiment of an apparatus for performing the function of the nozzle 22 in lifting liquid refrigerant into the evaporator 14 and in mixing weak gas with liquid refrigerant for passage into the evaporator. In this embodiment as in the first embodiment energy for performing this lifting is supplied by the weak gas flowing from the pipe 48 which is under pressure from the pump 17. In this embodiment the liquid refrigerant from the condenser 13 flows through the pipe 21 into chamber 60 and weak gas from the pipe 48 flows into the chamber. The gas and liquid are intermingled within the chamber and forced by pressure of the gas up the pipe 23 into the evaporator 14.

Having described our invention as related to the embodiments shown in the accompanying drawings, it is our intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. In a uniform pressure absorption refrigeration system charged with inert gas, refrigerant and absorption liquid and having a charging liquid level, apparatus comprising: a generator below said charging level; an absorber above said charging level; an evaporator above said charging level; pump means for simultaneously lifting liquid weak in refrigerant flowing from said generator to a location above said level for gravity flow through the absorber, for imparting pressure to gas from said absorber that is weak in refrigerant for flow in said system and for intermingling said weak liquid and substantially all said weak gas to aid in stripping remaining refrigerant from said weak gas; and means for flowing the thusly stripped weak gas to said evaporator.

2. In a uniform pressure absorption refrigeration system charged with inert gas, refrigerant and an absorption liquid and having a charging liquid level, apparatus comprising: a generator below said charging level; an absorber above said charging level; a gas-liquid separator extending above and below said charging level having an exit for liquid to said absorber; pump means for simultaneously lifting liquid weak in refrigerant into said separator for flow from said separator exit through said absorber and for imparting pressure to gas weak in refrigerant for flow in said system; and means in said separator below said charging level retarding excessively rapid liquid flow through said separator to the absorber.

3. In a uniform pressure absorption refrigeration system charged with inert gas, refrigerant and an absorption liquid and having a charging liquid level, apparatus comprising: a generator below said charging level; an absorber above said charging level; an evaporator above said charging level; a receiver having a portion receiving liquid rich in refrigerant from said absorber; a rich liquid line from said receiving portion to said generator, the liquid level in said receiver substantially coinciding with said charging level; pump means for simultaneously lifting liquid weak in refrigerant flowing from said generator to a location above said level for gravity flow through the absorber, for imparting pressure to gas from said absorber that is weak in refrigerant for flow in said system and for intermingling said weak liquid and substantially all said weak gas to aid in stripping remaining refrigerant from said weak gas; and means for flowing the thusly stripped weak gas to said evaporator.

4. In a uniform pressure absorption refrigeration system charged with inert gas, refrigerant and an absorption liquid and having a charging liquid level, apparatus comprising: a generator below said charging level; a condenser above said charging level for condensing gaseous refrigerant from said generator; an absorber above said charging level; an evaporator above said condenser; a conduit for gas rich in gaseous refrigerant extending from said evaporator to said absorber, a conduit for gas weak in gaseous refrigerant from said absorber; a heat exchanger above said charging level having separate passages for rich gas and weak gas from said conduits; conduit means forming a moisture trap between said passages; and a flow restrictor in said moisture trap conduit means.

5. In a uniform pressure absorption refrigeration system charged with inert gas, refrigerant and an absorption liquid and having a charging liquid level, apparatus comprising: a generator below said charging level; an absorber above said charging level; a gas-liquid separator extending above and below said charging level having an exit for liquid to said absorber; pump means for simultaneously lifting liquid weak in refrigerant into said separator for flow from said separator exit through said absorber, for imparting pressure to gas weak in refrigerant for flow in said system and for intermingling said weak liquid and weak gas to aid in stripping remaining refrigerant from said weak gas; means in said separator below said charging level retarding excessively rapid liquid flow through said separator to the absorber; a receiver having a portion receiving liquid rich in refrigerant from said absorber; a rich liquid line from said receiving portion to said generator, the liquid level in said receiver substantially coinciding with said charging level; a line for liquid weak in refrigerant from said generator to said pump, said rich liquid line and weak liquid line being beneath said charging level and in heat exchange relationship with each other; a condenser above said charging level for condensing gaseous refrigerant from said generator; an evaporator above said condenser; a vent conduit for rich vapor from a portion of said condenser normally containing liquid refrigerant to said absorber; lift means operated by the presence of said weak gas for lifting said liquid refrigerant into said evaporator and simultaneously intermingling said weak gas and liquid refrigerant for flow through said evaporator; a conduit for gas rich in gaseous refrigerant extending from said evaporator to said absorber; a conduit for gas weak in gaseous refrigerant from said absorber; a heat exchanger above said charging level having separate passages for rich gas and weak gas from said conduits; conduit means forming a moisture trap between said passages; and a flow restrictor in said moisture trap conduit means.

References Cited by the Examiner

UNITED STATES PATENTS

| | | | |
|---|---|---|---|
| 2,184,992 | 12/39 | Coons | 62—490 |
| 2,240,178 | 4/41 | Brace | 62—483 |
| 2,241,621 | 5/41 | Shoeld | 62—410 |
| 2,241,624 | 5/41 | Smellie | 62—490 X |
| 2,255,414 | 9/41 | Coons | 62—490 X |
| 2,279,080 | 4/42 | Taylor | 62—490 |
| 2,297,280 | 9/42 | Beach | 62—483 |
| 2,363,385 | 11/44 | Bixler | 62—490 X |
| 2,363,447 | 11/44 | Siedle | 62—485 |
| 2,498,945 | 2/50 | Edel | 62—497 |
| 3,055,194 | 9/62 | Fink | 62—483 |

ROBERT A. O'LEARY, *Primary Examiner.*

EDWARD J. MICHAEL, *Examiner.*